US012748214B2

(12) United States Patent
Ryu

(10) Patent No.: US 12,748,214 B2
(45) Date of Patent: Sep. 29, 2026

(54) VEHICLE CONTROL DEVICE AND VEHICLE CONTROL METHOD

(71) Applicants: Hyundai Motor Company, Seoul (KR); Kia Corporation, Seoul (KR)

(72) Inventor: Cho Rong Ryu, Incheon (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 85 days.

(21) Appl. No.: 18/823,155

(22) Filed: Sep. 3, 2024

(65) Prior Publication Data

US 2025/0199182 A1 Jun. 19, 2025

(30) Foreign Application Priority Data

Dec. 15, 2023 (KR) ........................ 10-2023-0183514

(51) Int. Cl.
*G01S 17/931* (2020.01)
*G06V 20/56* (2022.01)

(52) U.S. Cl.
CPC .......... *G01S 17/931* (2020.01); *G06V 20/588* (2022.01)

(58) Field of Classification Search
CPC ........ G01S 17/931; G01S 17/89; G01S 17/88; G06V 20/588; B60W 30/095; B60W 40/06; B60W 50/00; B60W 2050/0005; B60W 2050/0043; B60W 40/10; B60W 60/001; B60W 2420/408; B60W 2552/30; B60W 2552/53; B60W 2556/40; G01C 21/3815; G06T 7/11; G06T 2210/12
See application file for complete search history.

(56) References Cited

U.S. PATENT DOCUMENTS

2022/0146676 A1* 5/2022 Armstrong-Crews ........................ G01S 7/4808
2022/0179076 A1* 6/2022 Noh ........................ G01S 17/89

FOREIGN PATENT DOCUMENTS

CN 109740274 A * 5/2019
JP 2018205450 A * 12/2018
KR 102477510 B1 * 12/2022 ............ G06T 7/337

* cited by examiner

*Primary Examiner* — Scott A Browne
*Assistant Examiner* — Nazia Afrin
(74) *Attorney, Agent, or Firm* — MORGAN, LEWIS & BOCKIUS LLP

(57) ABSTRACT

A vehicle control device includes a Light Detection and Ranging (LiDAR), a memory that stores map information, and a processor. The processor may filter datasets including a road edge portion associated with a position of a vehicle from the map information according to a first specified condition, obtain a plurality of first partial line segments, identify a plurality of second partial line segments from a plurality of line segments formed by contour points corresponding to the road edge portion through the LiDAR, identify pairs of the plurality of second partial line segments and the plurality of first partial line segments, output a position of the vehicle in a second coordinate system different from a first coordinate system based on applying a specified algorithm to each of the pairs, and control the vehicle based on the position of the vehicle in the second coordinate system.

20 Claims, 8 Drawing Sheets

VEHICLE CONTROL DEVICE AND VEHICLE CONTROL METHOD

CROSS-REFERENCE TO RELATED APPLICATION

The present application claims priority to Korean Patent Application No. 10-2023-0183514, filed on Dec. 15, 2023, the entire contents of which is incorporated herein for all purposes by this reference.

BACKGROUND OF THE PRESENT DISCLOSURE

Field of the Present Disclosure

The present disclosure relates to a vehicle control device and method, and to technology for identifying a road edge portion using LiDAR and map information.

Description of Related Art

Various studies are being conducted to identify external objects using various sensors to assist driving of vehicle.

External objects may be identified using a Light Detection and Ranging (LiDAR) while the vehicle is driving in a driver assistance mode or an autonomous driving mode.

There is a need to accurately identify areas where the vehicle is able to drive by identifying road edge portions through the LiDAR. If the vehicle enters a curved road, there is a need to accurately identify the road edge portions of the curved road and accurately identify the lateral position and/or the amount of change in heading to generate a path for the vehicle and/or perform control of the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle control device and method configured for accurately identifying a road edge portion using map information and LiDAR sensor data.

Various aspects of the present disclosure are directed to providing a vehicle control device and method configured for generating a driving path for a vehicle by accurately identifying an area within the road edge portion where a vehicle is able to drive, thus providing a stable driving system.

Various aspects of the present disclosure are directed to providing a vehicle control device and method configured for improving positioning performance and performing data processing relatively rapidly and accurately by not using duplicate data.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle control device includes a Light Detection and Ranging (LiDAR), a memory that stores map information, and a processor, wherein the processor may filter datasets including a road edge portion associated with a position of a vehicle from the map information according to a first predetermined condition related to at least one of a distance, or an angle, or any combination thereof, obtain a plurality of first partial line segments by dividing a line segment included in at least one of the datasets and corresponding to the road edge portion based on a predetermined length, identify a plurality of second partial line segments from a plurality of line segments formed by contour points corresponding to the road edge portion through the LiDAR according to a second predetermined condition related to at least one of a distance, an angle, or a height, or any combination thereof, identify pairs of the plurality of second partial line segments and the plurality of first partial line segments that are respectively closest to the plurality of second partial line segments in a vehicle coordinate system represented using the vehicle as a center, output a position of the vehicle in a second coordinate system different from a first coordinate system by use of a calibration amount related to at least one of a lateral movement of the vehicle based on the first coordinate system, or an amount of change in heading of the vehicle, or any combination thereof based on applying a predetermined algorithm to each of the pairs, and control the vehicle based on the position of the vehicle in the second coordinate system.

According to an exemplary embodiment of the present disclosure, the processor may identify at least one of the plurality of first partial line segments, the plurality of second partial line segments, or the pairs, or any combination thereof, in a plane formed by a first axis and a second axis, among the first axis, the second axis, and a third axis.

According to an exemplary embodiment of the present disclosure, the processor may identify the plurality of second partial line segments in each of layers separated by a third axis, among a first axis, a second axis, and the third axis, and identify first sub-pairs included in each of the layers among the pairs. The first sub-pairs may include the plurality of first partial line segments that are respectively closest to the plurality of second partial line segments included in each of the layers.

According to an exemplary embodiment of the present disclosure, the processor may identify first identifiers assigned to the plurality of first partial line segments respectively, identify second identifiers assigned to the plurality of second partial line segments respectively, identify second sub-pairs in which a distance between the plurality of first partial line segments and the plurality of second partial line segments is less than a predetermined distance, among the pairs, and sequentially arrange at least one of the first identifiers or the second identifiers included in the identified second sub-pairs, or any combination thereof.

According to an exemplary embodiment of the present disclosure, the processor may select a part of the plurality of second partial line segments in a plurality of layers separated by a third axis, among a first axis, a second axis, and the third axis, based on a type of construction of the map information.

According to an exemplary embodiment of the present disclosure, the processor may identify a portion of the plurality of second partial line segments identified in a first reference number of layers located at a top of the plurality of layers based on the type of construction of the map information being a top line construction type, and select a portion of the plurality of second partial line segments that are closest to a construction height of the map information, among the portion of the plurality of second partial line segments identified in the first reference number of layers.

According to an exemplary embodiment of the present disclosure, the top line construction type may be a construction type in which the map information is generated based on a portion of the road edge portion identified at a highest height with respect to the third axis.

According to an exemplary embodiment of the present disclosure, the processor may identify a portion of the plurality of second partial line segments identified in a second reference number of layers located at a bottom of the plurality of layers based on the type of construction of the map information being a bottom line construction type.

According to an exemplary embodiment of the present disclosure, the bottom line construction type may be a construction type in which the map information is generated based on a portion of the road edge portion identified at a lowest height with respect to the third axis.

According to an exemplary embodiment of the present disclosure, the predetermined algorithm may include at least one of an iterative closest point (ICP) algorithm, or a simultaneous localization and mapping (SLAM) algorithm, or any combination thereof.

According to an aspect of the present disclosure, a vehicle control method includes filtering datasets including a road edge portion associated with a position of a vehicle from map information, according to a first predetermined condition related to at least one of a distance, or an angle, or any combination thereof, obtaining a plurality of first partial line segments by dividing a line segment included in at least one of the datasets and corresponding to the road edge portion based on a predetermined length, identifying a plurality of second partial line segments from a plurality of line segments formed by contour points corresponding to the road edge portion through a Light Detection and Ranging (LiDAR) according to a second predetermined condition related to at least one of a distance, an angle, or a height, or any combination thereof, identifying pairs of the plurality of second partial line segments and the plurality of first partial line segments that are respectively closest to the plurality of second partial line segments in a vehicle coordinate system represented using the vehicle as a center, outputting a position of the vehicle in a second coordinate system different from a first coordinate system by use of a calibration amount related to at least one of a lateral movement of the vehicle based on the first coordinate system, or an amount of change in heading of the vehicle, or any combination thereof based on applying a predetermined algorithm to each of the pairs, and controlling the vehicle based on the position of the vehicle in the second coordinate system.

According to an exemplary embodiment of the present disclosure, the vehicle control method may further include identifying at least one of the plurality of first partial line segments, the plurality of second partial line segments, or the pairs, or any combination thereof, in a plane formed by a first axis and a second axis, among the first axis, the second axis, and a third axis.

According to an exemplary embodiment of the present disclosure, the vehicle control method may further include identifying the plurality of second partial line segments in each of layers separated by a third axis, among a first axis, a second axis, and the third axis, and identifying first sub-pairs included in each of the layers among the pairs. The first sub-pairs may include the plurality of first partial line segments that are respectively closest to the plurality of second partial line segments included in each of the layers.

According to an exemplary embodiment of the present disclosure, the vehicle control method may further include identifying first identifiers assigned to the plurality of first partial line segments respectively, identifying second identifiers assigned to the plurality of second partial line segments respectively, identifying second sub-pairs in which a distance between the plurality of first partial line segments and the plurality of second partial line segments is less than a predetermined distance, among the pairs, and sequentially arranging at least one of the first identifiers or the second identifiers included in the identified second sub-pairs, or any combination thereof.

According to an exemplary embodiment of the present disclosure, the vehicle control method may further include selecting a portion of the plurality of second partial line segments in a plurality of layers separated by a third axis, among a first axis, a second axis, and the third axis, based on a type of construction of the map information.

According to an exemplary embodiment of the present disclosure, the vehicle control method may further include identifying a portion of the plurality of second partial line segments identified in a first reference number of layers located at a top of the plurality of layers based on the type of construction of the map information being a top line construction type, and selecting a portion of the plurality of second partial line segments that are closest to a construction height of the map information, among the portion of the plurality of second partial line segments identified in the first reference number of layers.

According to an exemplary embodiment of the present disclosure, the top line construction type may be a construction type in which the map information is generated based on a portion of the road edge portion identified at a highest height with respect to the third axis.

According to an exemplary embodiment of the present disclosure, the vehicle control method may further include identifying a portion of the plurality of second partial line segments identified in a second reference number of layers located at a bottom of the plurality of layers based on the type of construction of the map information being a bottom line construction type.

According to an exemplary embodiment of the present disclosure, the bottom line construction type may be a construction type in which the map information is generated based on a portion of the road edge portion identified at a lowest height with respect to the third axis.

According to an exemplary embodiment of the present disclosure, the predetermined algorithm may include at least one of an iterative closest point (ICP) algorithm, or a simultaneous localization and mapping (SLAM) algorithm, or any combination thereof.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
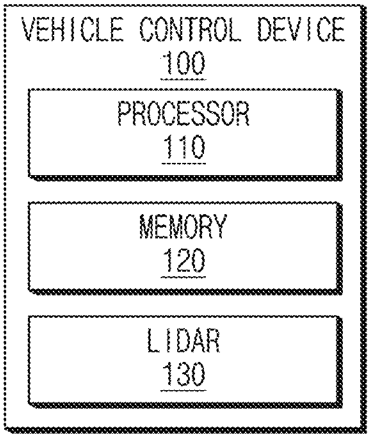
FIG. 1 shows an example of a block diagram relating to a vehicle control device according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of well-known features or functions will be ruled out in order not to unnecessarily obscure the gist of the present disclosure.

In describing the components of the exemplary embodiment of the present disclosure, terms such as first, second, “A”, “B”, (a), (b), and the like may be used. These terms are merely intended to distinguish one component from another component, and the terms do not limit the nature, sequence or order of the constituent components. Unless otherwise defined, all terms used herein, including technical or scientific terms, include the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, various exemplary embodiments of the present disclosure will be described in detail with reference to FIG. 1, FIG. 2, FIG. 3, FIG. 4, FIG. 5, FIG. 6, FIG. 7, and FIG. 8.

FIG. 1 shows an example of a block diagram relating to a vehicle control device according to an exemplary embodiment of the present disclosure.

Referring to FIG. 1, a vehicle control device 100 according to an exemplary embodiment of the present disclosure may be implemented inside or outside a vehicle, and portion of components included in the vehicle control device 100 may be implemented inside or outside the vehicle. In the instant case, the vehicle control device 100 may be integrally formed with internal control units of the vehicle, or may be implemented as a separate device and connected to the control units of the vehicle by separate connection means. For example, the vehicle control device 100 may further include components not shown in FIG. 1.

Referring to FIG. 1, the vehicle control device 100 according to various exemplary embodiments of the present disclosure may include a processor 110, a memory 120, and a Light Detection and Ranging (LiDAR) 130. The processor 110, the memory 120, or the LiDAR 130 may be electronically and/or operably coupled with each other by an electronical component including a communication bus.

Hereinafter, operationally coupling pieces of hardware may include direct and/or indirect connections between the pieces of hardware being established so that second hardware is controlled by first hardware among the pieces of hardware.

Different blocks are shown, but embodiments are not limited thereto. A portion of the pieces of hardware of FIG. 1 may be included in a single integrated circuit, including a system on a chip (SoC).

The types and/or number of pieces of hardware included within the vehicle control device 100 are not limited to those shown in FIG. 1. For example, the vehicle control device 100 may include only a portion of the hardware shown in FIG. 1.

The vehicle control device 100 according to various exemplary embodiments of the present disclosure may include hardware for processing data based on one or more instructions. The hardware for processing the data may include the processor 110. For example, the hardware for processing data may include an arithmetic and logic unit (ALU), a floating point unit (FPU), a field programmable gate array (FPGA), a central processing unit (CPU), and/or an application processor (AP).

For example, the processor 110 may include the structure of a single-core processor, or may include the structure of a multi-core processor including dual cores, quad cores, hexa cores, or octa cores.

According to an exemplary embodiment of the present disclosure, the memory 120 of the vehicle control device 100 may include hardware components for storing data and/or instructions that are input to and/or output from the processor 110 of the vehicle control device 100.

For example, the memory 120 may include a volatile memory including a random-access memory (RAM), or a non-volatile memory including a read-only memory (ROM).

For example, the volatile memory may include at least one of a dynamic RAM (DRAM), a static RAM (SRAM), a cache RAM, or a pseudo SRAM (PSRAM), or any combination thereof.

For example, the non-volatile memory may include at least one of a programmable ROM (PROM), an erasable PROM (EPROM), an electrically erasable PROM (EEPROM), a flash memory, hard disk, a compact disc, a solid state drive (SSD), or an embedded multi-media card (eMMC), or any combination thereof.

For example, map information may be stored in the memory 120 of the vehicle control device 100. For example, the map information may be generated (or produced) and stored in the memory based on at least one of a map creator, or a map generator, or any combination thereof.

For example, the map information may be generated based on various types of construction types. For example, the map information may be generated based on at least one of a top line construction type, or a bottom line construction type, or any combination thereof.

For example, the top line construction type may include a construction type in which map information is generated based on the positions of objects identified at the highest height with respect to a third axis among a first axis, a second axis, and the third axis.

For example, the bottom line construction type may include a construction type in which map information is generated based on the positions of objects identified at the lowest height with respect to the third axis among the first axis, the second axis, and the third axis.

The LiDAR 130 of the vehicle control device 100 according to various exemplary embodiments of the present disclosure may obtain datasets identifying a surrounding object of the vehicle control device 100. For example, the LiDAR 130 may identify a position, a movement direction, or a speed of the surrounding object, or any combination thereof based on the pulse laser signal emitted from the LiDAR 130 being reflected and returned to the surrounding object.

For example, the LiDAR 130 may obtain datasets representing an external object in a space formed by the first axis, the second axis, and the third axis based on the pulse laser signal reflected from the surrounding object. For example, the LiDAR 130 may obtain datasets that include a plurality of points in the space formed by the first, second, and third axes based on receiving a pulse laser signal at specified intervals.

According to an exemplary embodiment of the present disclosure, the processor 110 may use the LiDAR 130 to emit light from a vehicle. For example, the processor 110 may receive light emitted from the vehicle. For example, the processor 110 may identify at least one of the position, the speed, or the movement direction of the surrounding object, or any combination thereof based on a time at which light is emitted to the vehicle and a time at which light emitted by the vehicle is received.

The vehicle control device 100 according to various exemplary embodiments of the present disclosure may include a communication circuit in place of the memory 120. For example, the communication circuit of the vehicle control device 100 may include a hardware component for supporting the transmission and/or reception of signals between the vehicle control device 100 and an external electronic device. For example, the communication circuit may include at least one of a modem, an antenna, or an optic/electronic (O/E) converter, or any combination thereof. The aforementioned external electronic device may include at least one of a hardware component or a software component, which is different from the vehicle control device 100 included in the vehicle, or any combination thereof.

For example, the communication circuit may support the transmission or reception of signals based on various types of protocols, including at least one of Ethernet, local area network (LAN), wide area network (WAN), wireless fidelity (WiFi), Bluetooth, Bluetooth low energy (BLE), ZigBee, Long Term Evolution (LTE), 5G new radio (NR), Controller Area Network (CAN), or Local Interconnect Network (LIN), or any combination thereof.

For example, the processor 110 of the vehicle control device 100 may perform a process substantially identical to a process of using the map information stored in the memory 120 based on receiving the map information via the communication circuit.

The processor 110 of the vehicle control device 100 according to various exemplary embodiments of the present disclosure may filter datasets including a road edge portion associated with the position of the vehicle, according to a first specified condition related to at least one of a distance, or an angle, or any combination thereof from the map information stored in the memory 120 (or map information received via the communication circuit). For example, the road edge portion associated with the position of the vehicle may refer to a boundary of a road on which the vehicle is traveling.

The processor 110 of the vehicle control device 100 according to various exemplary embodiments of the present disclosure may divide a line segment included in at least one of the datasets including the road edge portion associated with the position of the vehicle and corresponding to the road edge portion, based on a specified length.

For example, the processor 110 may obtain a plurality of first partial line segments by dividing the line segment included in at least one of the datasets including the road edge portion associated with the position of the vehicle and corresponding to the road edge portion, based on the specified length.

For example, the processor 110 may obtain the plurality of first partial line segments by dividing the line segment corresponding to the road edge portion by a specified length or less. For example, the specified length may include about 10 meters (m).

According to an exemplary embodiment of the present disclosure, the processor 110 may obtain a point cloud representing a road edge portion via the LiDAR 130. The processor 110 may identify contour points corresponding to the road edge portion within the point cloud based on obtaining the point cloud representing the road edge portion. The processor 110 may identify a plurality of second partial line segments according to a second specified condition related to at least one of a distance, an angle, or a height, or any combination thereof, among a plurality of line segments formed by the contour points corresponding to the road edge portion. For example, each of the second partial line segments may be referred to as a segment.

According to an exemplary embodiment of the present disclosure, the processor 110 may arrange the plurality of first partial line segments and the plurality of second partial line segments based on a vehicle. For example, the processor 110 may arrange the plurality of first partial line segments and the plurality of second partial line segments in a vehicle coordinate system formed based on the vehicle.

According to an exemplary embodiment of the present disclosure, the processor 110 may identify a distance between the plurality of first partial line segments and the plurality of second partial line segments in the vehicle coordinate system. For example, the processor 110 may identify the plurality of first partial line segments that are respectively closest to the plurality of second partial line segments. For example, the processor 110 may identify pairs of the plurality of first partial line segments that are respectively closest to the plurality of second partial line segments in the vehicle coordinate system.

According to an exemplary embodiment of the present disclosure, the processor 110 may identify at least one of the plurality of first partial line segments, the plurality of second partial line segments, or the pairs, or any combination thereof, in a plane formed by the first and second axes, among the first axis, the second axis, and the third axis.

According to an exemplary embodiment of the present disclosure, the processor 110 may identify a plurality of second partial line segments in each of layers separated by the third axis, among the first, second, and third axes. The processor 110 may identify first sub-pairs included in each of the layers among the pairs. For example, the first sub-pairs may include a plurality of first partial line segments that are respectively closest to the second partial line segments included in each of the layers.

According to an exemplary embodiment of the present disclosure, the processor 110 may identify first identifiers respectively assigned to the plurality of first partial line segments. The processor 110 may identify second identifiers respectively assigned to the plurality of second partial line segments.

According to an exemplary embodiment of the present disclosure, the processor 110 may identify second sub-pairs where the distances between the plurality of first partial line segments and the plurality of second partial line segments are less than a specified distance, among the pairs. The processor 110 may sequentially arrange at least one of the first identifiers or the second identifiers included in the identified second sub-pairs, or any combination thereof.

According to an exemplary embodiment of the present disclosure, the processor 110 may select portion of the plurality of second partial line segments in the plurality of layers separated by the third axis, among the first axis, the second axis, and the third axis, based on the type of construction of the map information.

For example, the processor 110 may select portion of a plurality of second partial line segments identified in a first reference number of layers located at the top portion of the plurality of layers based on the type of construction of the map information being a top line construction type. For example, the top line construction type may include the map information being generated based on a portion of the road edge portion identified at the highest height with respect to the third axis.

For example, the processor 110 may select portion of a plurality of second partial line segments that are closest to a construction height of the map information among the plurality of second partial line segments identified in the first reference number of layers, based on the type of construction of the map information being a top line construction type.

For example, the processor 110 may select portion of the plurality of second partial line segments identified in a second reference number of layers located at the bottom of the plurality of layers based on the type of construction of the map information being a bottom line construction type. For example, the bottom line construction type may include the map information being generated based on a portion of the road edge portion identified at the lowest height with respect to the third axis.

According to an exemplary embodiment of the present disclosure, the processor 110 may apply a specified algorithm to each of the pairs based on identifying a plurality of first partial line segments respectively closest to a plurality of second partial line segments in the vehicle coordinate system. For example, the specified algorithm may include at least one of an iterative closest point (ICP) algorithm, or a simultaneous localization and mapping (SLAM) algorithm, or any combination thereof.

For example, the processor 110 may obtain a calibration amount related to at least one of a lateral movement of the vehicle in the first coordinate system, or the amount of change in the heading of the vehicle, or any combination thereof, based on applying the specified algorithm to each of the pairs. For example, the first coordinate system may include a relative coordinate system of a vehicle center.

According to an exemplary embodiment of the present disclosure, the processor 110 may be configured to predict a position of the vehicle based on the LiDAR 130. For example, the processor 110 may be configured to predict the position of the vehicle in the next frame based on datasets obtained by the LiDAR 130.

According to an exemplary embodiment of the present disclosure, the processor 110 may apply the obtained calibration amount to the predicted position of the vehicle. For example, the processor 110 may identify a position of the vehicle in a second coordinate system which is different from the first coordinate system based on applying the obtained calibration amount to the predicted position of the vehicle. For example, the second coordinate system may include a vehicle absolute coordinate system. For example, the second coordinate system may include a latitude-longitude-height (LLH) coordinate system.

For example, the processor 110 may output a position of the vehicle in the second coordinate system which is different from the first coordinate system based on applying the obtained calibration amount to the predicted position of the vehicle.

As described above, the vehicle control device 100 according to various exemplary embodiments of the present disclosure may avoid using duplicate data by use of sequentially disposed pairs. By avoiding the use of duplicate data, the vehicle control device 100 may improve positioning performance by identifying road edge portion based on far-field data.

Furthermore, by continuously securing the positioning performance, the vehicle control device 100 may improve control performance in the driver assistance mode or the autonomous driving mode of the vehicle and provide an effect of causing stable operation of an autonomous driving system.

Figure 2:
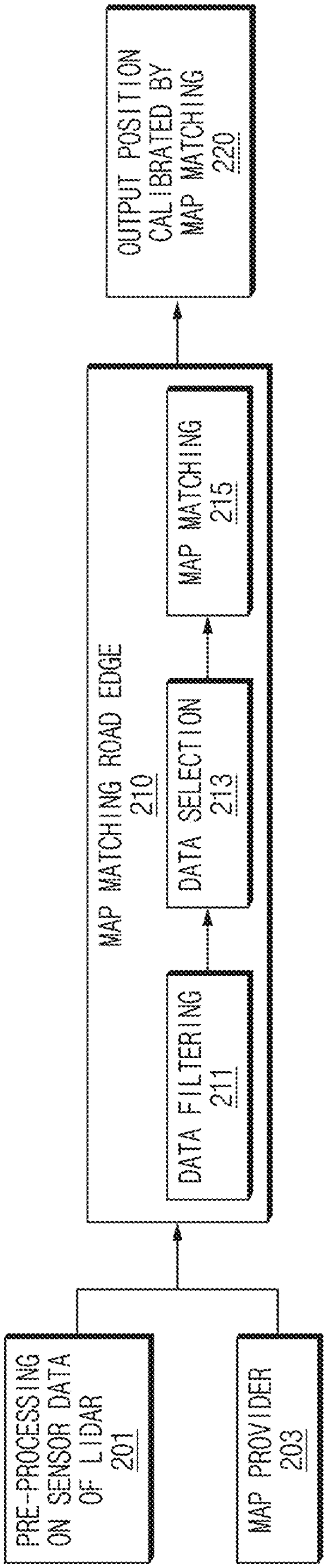
FIG. 2 shows an example of a process for outputting a position of a vehicle, according to an exemplary embodiment of the present disclosure.

FIG. 2 shows an example of a process for outputting a position of a vehicle, according to an exemplary embodiment of the present disclosure.

Referring to FIG. 2, a processor (e.g., the processor 110 of FIG. 1) of a vehicle control device (e.g., the vehicle control device 100 of FIG. 1) according to various exemplary embodiments of the present disclosure may perform pre-processing 201 on sensor data from a Light Detection and Ranging (LiDAR) (e.g., the LiDAR 130 of FIG. 1).

For example, the processor is configured to perform pre-processing 201 on the sensor data obtained via the LiDAR. For example, the processor may obtain a plurality of points corresponding to an external object based on identifying a pulse laser signal reflected from the external object through the LiDAR. The processor is configured to generate a point cloud representing the external object based on obtaining the plurality of points corresponding to the external object.

For example, the processor may identify contour points in the point cloud based on generating the point cloud representing the external object. For example, the contour points may be identified in each of layers formed along a third axis, among a first axis, a second axis, and a third axis. For example, the first axis may include an x-axis. For example, the second axis may include a y-axis. For example, the third axis may include a z-axis.

For example, the contour points may be obtained based on representative points included in the point cloud in each of the layers formed along the third axis of the first axis, the second axis, and the third axis. For example, the representative points may include all or a portion of points located relatively away from the center portion point of the point cloud among the plurality of points included in the point cloud. For example, the point cloud may be obtained by performing clustering, based on each of the points obtained by the LiDAR being identified within a specified distance.

According to an exemplary embodiment of the present disclosure, the processor may identify a point cloud corresponding to a road edge portion. The processor may identify contour points in the point cloud corresponding to the road edge portion. The processor may identify a line segment connecting the contour points based on identifying the contour points representing the whole or a portion of the road edge portion. For example, the processor may identify line segments connecting two contour points including the smallest distance among the contour points representing the whole or a portion of the road edge portion.

According to an exemplary embodiment of the present disclosure, the processor may obtain map information from a map provider 203. For example, the map provider 203 may include a map creator that generates (or builds) map information and stores the map information in at least one of a memory of the vehicle control device (e.g., the memory 120 of FIG. 1), or a hardware component or a software component, which is different from the vehicle control device, or any combination thereof.

For example, the map provider 203 may be configured to generate map information based on at least one of a first construction type, or a second construction type, or any combination thereof. For example, the first construction type may include a top line construction type. For example, the second construction type may include a bottom line construction type.

For example, the first construction type may include a construction type representing positions of external objects based on the highest layer of the external objects utilized to generate map information.

For example, the second construction type may include a construction type expressing positions of external objects based on the lowest layer of the external objects utilized to generate map information.

According to an exemplary embodiment of the present disclosure, the processor may input first data obtained by performing the pre-processing 201 on the sensor data of the LiDAR, and the map information generated by the map provider 203 into a map matching road edge portion 210.

For example, the map matching road edge portion 210 may be included in the vehicle control device. For example, the map matching road edge portion 210 may perform at least one of data filtering 211, data selection 213, or map matching 215, or any combination thereof.

For example, the data filtering 211 may include a function of filtering all or portion of the sensor data obtained by performing the pre-processing 201 on the sensor data of the LiDAR. For example, the data filtering 211 may include a function of filtering out all or portion of a road edge portion from the map information generated by the map provider 203.

For example, the data filtering 211 may include a function of filtering datasets associated with a road edge portion from the map information based on a first specified condition related to at least one of a distance, or an angle, or any combination thereof.

The datasets associated with a road edge portion included in the map information may include a length of the road edge portion.

For example, the data filtering 211 may include a function of filtering datasets obtained by the LiDAR based on a second specified condition related to at least one of a distance, an angle, or a height, or any combination thereof, among the datasets obtained by the LiDAR.

For example, in the first specified condition related to at least one of a distance, or an angle, or any combination thereof, and/or the second specified condition related to at least one a distance, an angle, or a height, or any combination thereof, the first specified condition and/or the second specified condition, which are associated with the distance, may be associated with a distance between first partial line segment corresponding to a road edge portion represented in the map information and second partial line segments corresponding to a road edge portion identified by the LiDAR.

For example, if the distance between the first partial line segments and the second partial line segments exceeds a reference distance, the processor may delete (or exclude) the first and second partial line segments between which the distance exceeds the reference distance, from candidate datasets.

For example, the first specified condition and/or the second specified condition, which are associated with the angle, may be associated with an angle formed by each of the line segments corresponding to a road edge portion represented in the map information and each of the second partial line segments corresponding to a road edge portion identified by the LiDAR.

For example, if angles formed by the line segments corresponding to the road edge portion and the second partial line segments exceed a reference angle, the processor may delete (or exclude), from the candidate sets, the line segments and the second partial line segment whose angles exceed the reference angle.

For example, the second specified condition associated with height may be associated with a height at which the second partial line segments corresponding to a road edge portion identified by the LiDAR are identified.

For example, if the second partial line segments exceed a reference height, the processor may delete (or exclude), from the candidate sets, the second partial line segments that exceed the reference height.

According to an exemplary embodiment of the present disclosure, the processor is configured to perform data selection 213. For example, the processor is configured to perform the data selection 213 in selecting at least a portion of datasets resulting from the data filtering 211.

For example, the processor may divide line segments that exceed a reference length among the line segments corresponding to a road edge portion, resulting from the data filtering 211. For example, the reference length may include about 10 meters (m).

For example, because the length of the road edge portion represented by the datasets associated with the road edge portion may be hundreds of meters, the processor may obtain first partial line segments based on dividing the line segments that exceed the reference length among the line segments corresponding to the road edge portion.

According to an exemplary embodiment of the present disclosure, the processor may identify a distance between the first partial line segments and the second partial line segments. For example, the processor may identify a distance between each of the first partial line segments and each of the second partial line segments.

For example, the processor may identify at least a portion of the first partial line segments that are respectively closest to the second partial line segments. Based on identifying the at least a portion of the first partial line segments respectively closest to the second partial line segments, the processor may obtain (or select) pairs including the second partial line segments and the at least a portion of the first partial line segments respectively closest to the second partial line segments.

The operations described above may be referred to as data selection 213.

According to an exemplary embodiment of the present disclosure, the processor is configured to perform the map matching 215 based on performing the data selection 213. The processor is configured to perform the map matching 215 by utilizing the selected pairs based on performing the data selection 213.

For example, the processor may apply a specified algorithm to the pairs. For example, the specified algorithm may include at least one of an Iterative Closest Point (ICP) algorithm, or a Simultaneous Localization and Mapping (SLAM) algorithm, or any combination thereof. However, the specified algorithm is not limited to the above-described algorithms.

According to an exemplary embodiment of the present disclosure, the processor is configured to determine a calibration amount related to at least one of a lateral movement of the vehicle, or the amount of change in heading of the vehicle, or any combination thereof based on applying the specified algorithm to the pairs.

For example, the processor may obtain a calibration amount based on at least one of a lateral movement of the vehicle, or the amount of change in heading of the vehicle, or any combination thereof. For example, the processor may apply at least one of the lateral movement of the vehicle, or the amount of change in the heading of the vehicle, or any combination thereof to the predicted position of the vehicle.

For example, the predicted position of the vehicle may include a position of the vehicle identified in a frame different from the first frame obtained by the LiDAR. For example, the frame different from the first frame may include a second time point of the first time point at which the first frame is identified.

Figure 3:
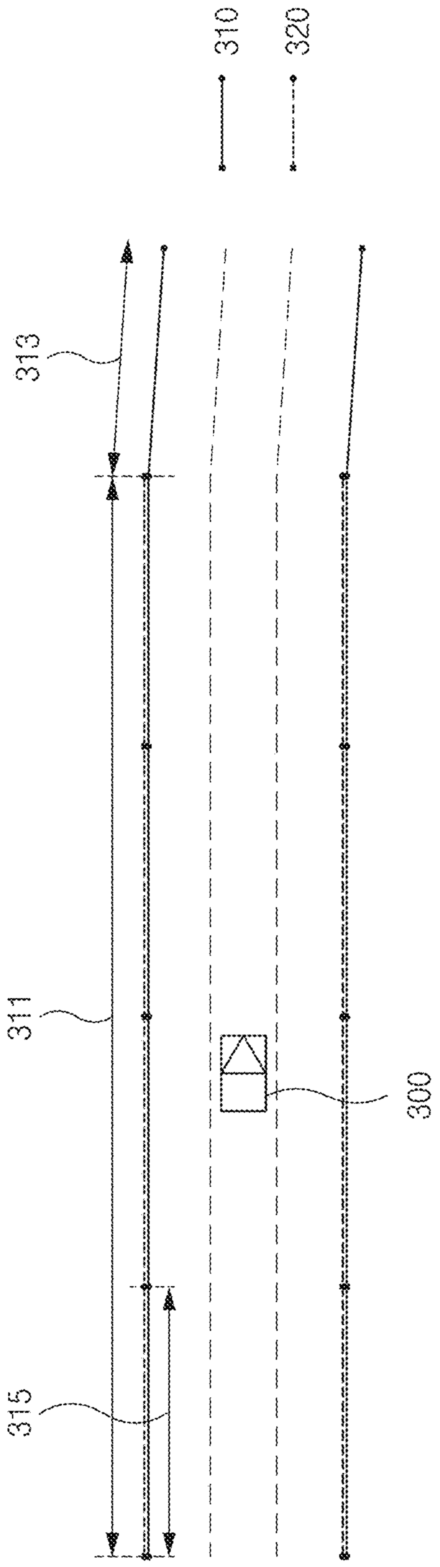
FIG. 3 shows an example of dividing a line segment corresponding to a road edge portion, according to an exemplary embodiment of the present disclosure.

FIG. 3 shows an example of dividing a line segment corresponding to a road edge portion, according to an exemplary embodiment of the present disclosure.

Referring to FIG. 3, a processor (e.g., the processor 110 of FIG. 1) of a vehicle control device (e.g., the vehicle control device 100 of FIG. 1) according to various exemplary embodiments of the present disclosure may identify a line segment 310 corresponding to the road edge portion of a road on which a vehicle 300 is driving, from map information.

According to an exemplary embodiment of the present disclosure, the processor 110 may divide the line segment 310 corresponding to a road edge portion related to the position of the vehicle 300 in the map information.

For example, the processor may divide the line segment 310 corresponding to the road edge portion based on a specified length. For example, the processor may divide the line segment 310 corresponding to the road edge portion into a specified length or less, based on the line segment 310 corresponding to the road edge portion exceeding the specified length. For example, the specified length may include approximately 10 m.

In FIG. 3, a first line segment 311 is a line segment that exceeds the specified length and may refer to a line segment before division. A second line segment 313 is also a line segment before division, but is less than or equal to the specified length, and the lengths of the second line segment 313 before and after division may be substantially the same. A third line segment 315 is a portion of the plurality of first partial line segments described in FIG. 1 and FIG. 2 and may include at least a portion obtained by dividing the first line segment 311 that exceeds the specified length. Partial line segments 320 shown in FIG. 3 are line segments less than or equal to the specified length and may include the plurality of first partial line segments described in FIG. 1 and FIG. 2.

Figure 4:
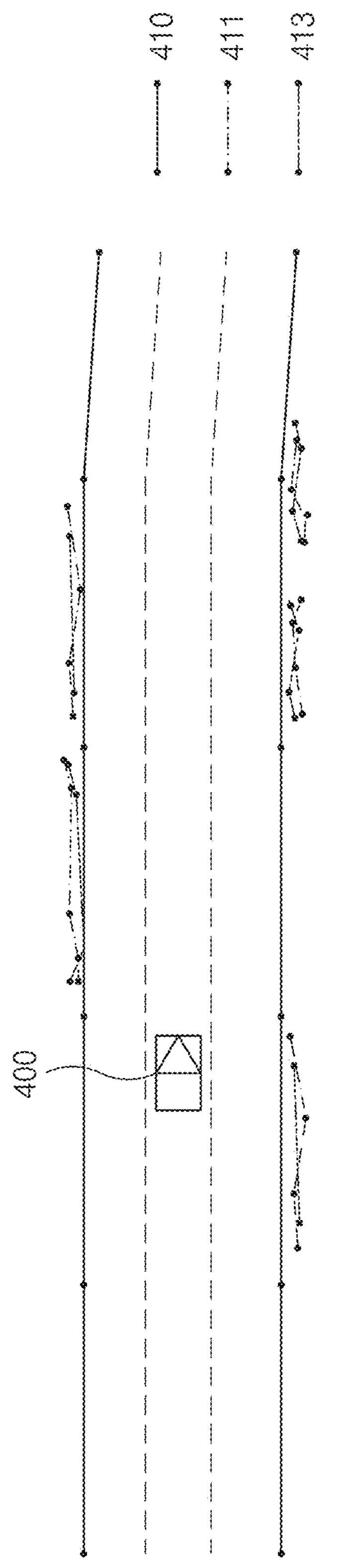
FIG. 4 shows an example of identifying pairs of first partial line segments and second partial line segments, according to an exemplary embodiment of the present disclosure.

FIG. 4 shows an example of identifying pairs of first partial line segments and second partial line segments, according to an exemplary embodiment of the present disclosure.

Referring to FIG. 4, a processor (e.g., the processor 110 of FIG. 1) of a vehicle control device (e.g., the vehicle control device 100 of FIG. 1) according to various exemplary embodiments of the present disclosure may identify a plurality of first partial line segments 410 corresponding to at least a portion of the road edge portion related to the position of a vehicle 400. According to an exemplary embodiment of the present disclosure, the processor may identify a plurality of second partial line segments 411 and 413 corresponding to at least a portion of the road edge portion through a Light Detection and Ranging (LiDAR).

For example, the plurality of second partial line segments 411 and 413 may include partial line segments identified in each of layers. For example, the first portions 411 of the plurality of second partial line segments 411 and 413 may include second partial line segments corresponding to at least a portion of the road edge portion identified in a first layer. For example, the second portions 413 of the plurality of second partial line segments 411 and 413 may include second partial line segments corresponding to at least a portion of the road edge portion identified in a second layer different from the first layer. For convenience of description, separation between a first layer and a second layer has been made, and the number of layers is not limited to the above-described number.

According to an exemplary embodiment of the present disclosure, the processor may identify pairs of the first partial line segments 410 and the second partial line segments 411 and 413. For example, the processor may identify the first partial line segments 410 that are respectively closest to the second partial line segments 411 and 413. For example, the processor may identify pairs of the second partial line segments 411 and 413 and the first partial line segments 410 that are respectively closest to the second partial line segments 411 and 413 based on identifying the first partial line segments 410 that are respectively closest to the second partial line segments 411 and 413, in a vehicle coordinate system. For example, each of the pairs may be referred to as a matching pair.

According to an exemplary embodiment of the present disclosure, the processor may identify identifiers of the first partial line segments 410 and the second partial line segments 411 and 413 included in the pairs, based on identifying the pairs. For example, the first identifiers assigned to the first partial line segments 410 may be represented in formats such as "map ID 1000", "map ID 1001", "map ID 1002", and "map ID 2002". For example, the second identifiers assigned to the second partial line segments 411 and 413 may be represented in formats such as "Obj #1", "Obj #2", and "Obj #3".

According to an exemplary embodiment of the present disclosure, the processor may sequentially arrange the identifiers with respect to one of the first partial line segments 410 or the second partial line segments 411 and 413 included in the pairs.

As described above, the processor of the vehicle control device according to various exemplary embodiments of the present disclosure may easily manage data by identifying matching pairs and sequentially arranging identifiers included in the identified matching pairs. Furthermore, by sequentially arranging and outputting identifiers, it is possible to provide assistance in selecting the driving path of the vehicle if the vehicle is operated in at least one of a driving assistance mode, or a driver assistance mode, or any combination thereof.

Figure 5:
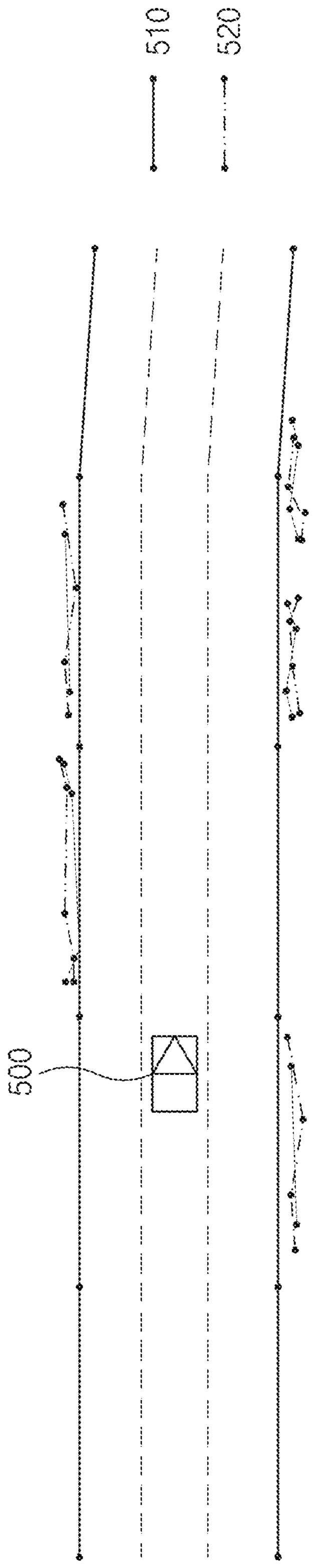
FIG. 5 shows an example of selecting pairs corresponding to a road edge portion, according to an exemplary embodiment of the present disclosure.

FIG. 5 shows an example of selecting pairs corresponding to a road edge portion, according to an exemplary embodiment of the present disclosure.

Referring to FIG. 5, the processor (e.g., the processor 110 of FIG. 1) of a vehicle control device (e.g., the vehicle control device 100 of FIG. 1) according to various exemplary embodiments of the present disclosure may identify a plurality of first partial line segments 510 corresponding to a road edge portion included in map information.

According to an exemplary embodiment of the present disclosure, the processor may identify pairs of a plurality of second partial line segments 520 and the plurality of first partial line segments 510 that are respectively closest to the plurality of second partial line segments 520 in a vehicle coordinate system. The processor may arrange the pairs sequentially. For example, the processor may identify at least one of the first identifiers of the plurality of first partial line segments 510 or the second identifiers of the plurality of second partial line segments 520, or any combination thereof. The processor may sequentially arrange the pairs based on either the first identifiers or the second identifiers.

According to an exemplary embodiment of the present disclosure, the processor may identify sub-pairs including the plurality of first partial line segments 510 that are identified within a specified distance from the plurality of second partial line segments 520, respectively. For example, the specified distance mentioned above may include approximately 0.5 m.

According to an exemplary embodiment of the present disclosure, the processor may arrange the identified sub-pairs based on the second identifiers of the plurality of second partial line segments 520. For example, the processor may sequentially arrange the identified sub-pairs based on the order of the second identifiers of the plurality of second partial line segments 520.

According to an exemplary embodiment of the present disclosure, the processor may identify at least one of the top layer, or the bottom layer, or any combination thereof with respect to a third axis among a first axis, a second axis, and the third axis, based on at least one of the second identifiers, or the construction type of map information, or any combination thereof.

For example, the processor may identify a portion of the plurality of second partial line segments 520, which are relatively the longest in at least one of the top layer, or the bottom layer, or any combination thereof.

For example, if the construction type of the map information is the top line construction type, the processor may select a portion of the second partial line segments 520 identified in the top layer with the highest height and an upper layer adjacent to the top layer, among the plurality of second partial line segments 520.

For example, if the construction type of map information is the top line construction type, the processor may select a portion of the plurality of second partial line segments 520 that are closest to the map construction height, among the plurality of second partial line segments 520.

For example, if the construction type of map information is a bottom line construction type, the processor may select a portion of the plurality of second partial line segments 520 identified in the bottom layer.

According to an exemplary embodiment of the present disclosure, the processor may apply a specified algorithm to a portion of the plurality of second partial line segments 520 selected according to the construction type of map information. The processor may identify at least one of the lateral movement of the vehicle, or the amount of change in heading of the vehicle, or any combination thereof, by applying the specified algorithm to a portion of the selected plurality of second partial line segments 520.

According to an exemplary embodiment of the present disclosure, the processor is configured to predict and output the position of the vehicle based on identifying at least one of the lateral movement of the vehicle, or the amount of change in heading of the vehicle, or any combination thereof.

As described above, the processor of the vehicle control device may sequentially list identifiers and predict and output the position of the vehicle using pairs corresponding to the sequentially listed identifiers, thus avoiding the use of duplicate data. The processor is configured to perform processes relatively rapidly by not using duplicate data.

Additionally, the processor is configured to output a predicted vehicle position and operate in a driving assistance mode or autonomous driving mode based on the predicted vehicle position, improving positioning performance and enhancing user experience by providing stable operation to a user.

Figure 6:
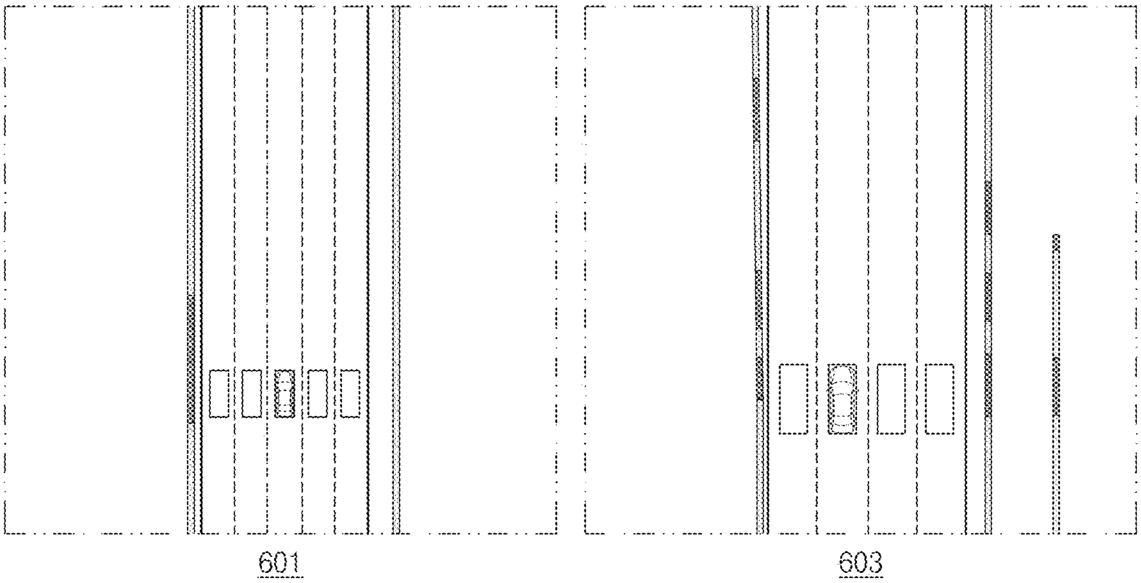
FIG. 6 shows an example of a result before applying the present disclosure and an example of a result after applying the present disclosure.

FIG. 6 shows an example of a result before applying the present disclosure and an example of a result after applying the present disclosure.

Referring to FIG. 6, a first example 601 in FIG. 6 may include an example before applying the present disclosure. A second example 603 in FIG. 6 may include an example of a result of applying the present disclosure.

It may be seen that, in the first example 601, the road edge portion is not clearly identified while, in the second example 603, the road edge portion is accurately identified. Additionally, the road edge portion may be identified relatively rapidly by applying the present disclosure.

By rapidly and accurately identifying the road edge portion, it is possible to drive stably on curved roads if the vehicle is operating in the driver assistance mode or the autonomous driving mode.

Figure 7:
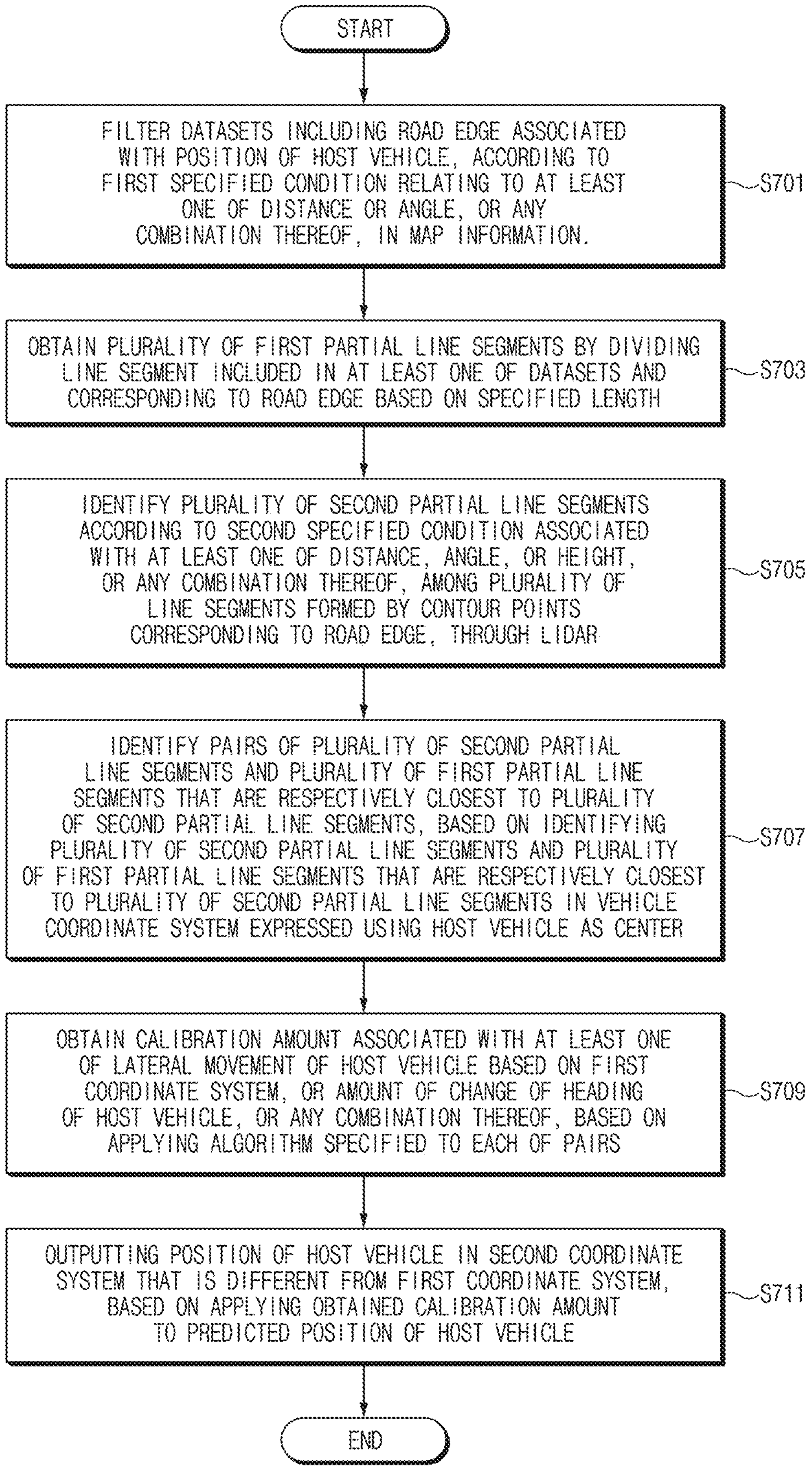
FIG. 7 shows an example of a flowchart related to a vehicle control method according to an exemplary embodiment of the present disclosure.

Hereinafter, a vehicle control method according to an exemplary embodiment of the present disclosure will be described in detail with reference to FIG. 7. FIG. 7 shows an example of a flowchart related to a vehicle control method according to an exemplary embodiment of the present disclosure.

Hereinafter, it is assumed that the vehicle control device 100 of FIG. 1 is configured to perform the process of FIG. 7. Additionally, in the description of FIG. 7, operations described as being performed by the device may be understood as being controlled by the processor 110 of the vehicle control device 100.

At least one of operations in FIG. 7 may be performed by the vehicle control device 100 in FIG. 1. At least one of the operations in FIG. 7 may be controlled by the processor 110 in FIG. 1. The operations in FIG. 7 may be performed sequentially, but not necessarily performed sequentially. For example, the order of the operations may be changed, and at least two operations may be performed in parallel.

Referring to FIG. 7, in operation S701, a vehicle control method according to various exemplary embodiments of the present disclosure may include filtering datasets including a road edge portion associated with the position of a vehicle, according to a first specified condition relating to at least one of a distance, or an angle, or any combination thereof, in map information.

In operation S703, the vehicle control method according to various exemplary embodiments of the present disclosure may include obtaining a plurality of first partial line segments by dividing a line segment included in at least one of the datasets and corresponding to a road edge portion based on a specified length.

In operation S705, the vehicle control method according to various exemplary embodiments of the present disclosure may include identifying a plurality of second partial line segments according to a second specified condition related to at least one of a distance, an angle, or a height, or any combination thereof, among a plurality of line segments formed by contour points corresponding to the road edge portion, through a Light Detection and Ranging (LiDAR).

In operation S707, the vehicle control method according to various exemplary embodiments of the present disclosure may include identifying pairs of a plurality of second partial line segments and a plurality of first partial line segments that are respectively closest to the plurality of second partial line segments, based on identifying the plurality of second partial line segments and the plurality of first partial line segments that are respectively closest to the plurality of second partial line segments in a vehicle coordinate system represented using the vehicle as a center.

According to an exemplary embodiment of the present disclosure, the vehicle control method may include identifying at least one of the plurality of first partial line segments, the plurality of second partial line segments, or the pairs, or any combination thereof, in a plane formed by first and second axes, among the first axis, the second axis, and the third axis.

According to an exemplary embodiment of the present disclosure, the vehicle control method may include identifying a plurality of second partial line segments in each of layers separated by the third axis, among the first, second, and third axes. The vehicle control method may include identifying first sub-pairs included in each of the layers among the pairs. For example, the first sub-pairs may include a plurality of first partial line segments that are respectively closest to the second partial line segments included in each of the layers.

According to an exemplary embodiment of the present disclosure, the vehicle control method may include identifying first identifiers respectively assigned to the plurality of first partial line segments. The vehicle control method may include identifying second identifiers respectively assigned to the plurality of second partial line segments.

According to an exemplary embodiment of the present disclosure, the vehicle control method may include identifying second sub-pairs where the distances between the plurality of first partial line segments and the plurality of second partial line segments are less than a specified distance, among the pairs.

According to an exemplary embodiment of the present disclosure, the vehicle control method may include sequentially arranging at least one of the first identifiers or the second identifiers included in the identified second sub-pairs, or any combination thereof.

According to an exemplary embodiment of the present disclosure, the vehicle control method may include selecting a portion of the plurality of second partial line segments in the plurality of layers separated by the third axis, among the first axis, the second axis, and the third axis, based on the type of construction of the map information.

According to an exemplary embodiment of the present disclosure, the vehicle control method may include selecting a portion of a plurality of second partial line segments identified in a first reference number of layers located at the top portion of the plurality of layers based on the type of construction of the map information being a top line construction type. For example, the top line construction type may include map information being generated based on a portion of the road edge portion identified at the highest height with respect to the third axis. For example, the first reference number may include about 2.

A vehicle control method according to various exemplary embodiments of the present disclosure may include identifying a portion of a plurality of second partial line segments identified in the first reference number of layers. The vehicle control method may include selecting a portion of the plurality of second partial line segments that are closest to the construction height of the map information, among the portion of the plurality of second partial line segments identified in the first reference number of layers. According to an exemplary embodiment of the present disclosure, the vehicle control method may include storing, in a memory, the portion of the plurality of second partial line segments identified in the first reference number of layers.

According to an exemplary embodiment of the present disclosure, the vehicle control method may include selecting a portion of a plurality of second partial line segments identified in a second reference number of layers located at the bottom of the plurality of layers based on the type of construction of the map information being a bottom line construction type. For example, the bottom line construction type may include map information being generated based on a portion of the road edge portion identified at the lowest height with respect to the third axis. For example, the second reference number may include about 1.

In operation S709, the vehicle control method according to various exemplary embodiments of the present disclosure may include obtaining a calibration amount related to at least one of a lateral movement of the vehicle based on a first coordinate system, or an amount of change in the heading of the vehicle, or any combination thereof, based on applying an algorithm specified to each of the pairs.

For example, the specified algorithm may include at least one of an Iterative Closest Point (ICP) algorithm or a Simultaneous Localization and Mapping (SLAM) algorithm, or any combination thereof.

In operation S711, the vehicle control method may include outputting the position of the vehicle on a second coordinate system which is different from the first coordinate system, based on applying the obtained calibration amount to the predicted position of the vehicle.

As described above, the vehicle control method according to various exemplary embodiments of the present disclosure may improve positioning performance by identifying a road edge portion based on long-distance data by not using duplicate data.

Furthermore, the vehicle control method may improve control performance in the driver assistance mode or the autonomous driving mode of the vehicle and promote stable operation of the autonomous driving system by continuously securing positioning performance.

Figure 8:
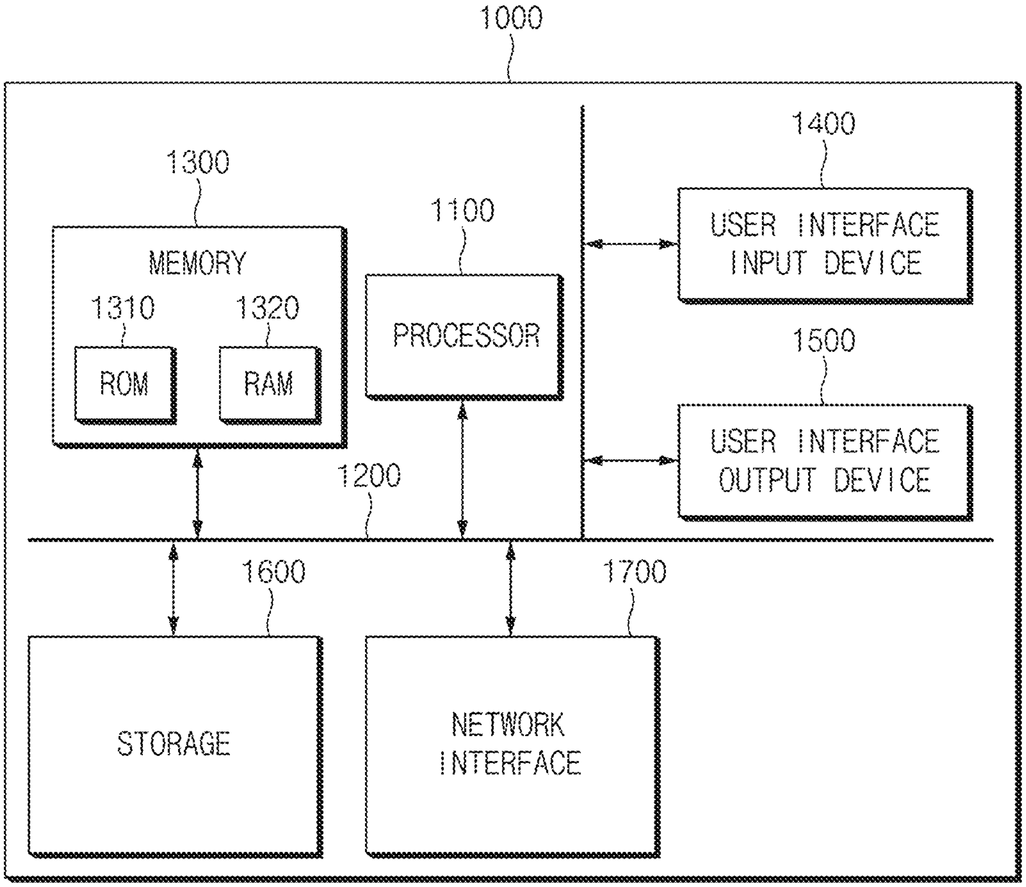
FIG. 8 shows a computing system related to a vehicle control device or a vehicle control method according to an exemplary embodiment of the present disclosure.

FIG. 8 shows an computing system related to a vehicle control device or a vehicle control method according to an exemplary embodiment of the present disclosure.

Referring to FIG. 8, a computing system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read Only Memory (ROM) and a Random Access Memory (RAM).

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains.

Accordingly, the exemplary embodiment included in an exemplary embodiment of the present disclosure is not intended to limit the technical idea of the present disclosure but to describe the present disclosure, and the scope of the technical idea of the present disclosure is not limited by the embodiment. The scope of protection of the present disclosure should be interpreted by the following claims, and all technical ideas within the scope equivalent thereto should be construed as being included in the scope of the present disclosure.

The present technology may accurately identify a road edge portion using map information and LiDAR sensor data.

Furthermore, the present technology may be configured to generate a driving path for a vehicle by accurately identifying an area within the road edge portion where a vehicle is configured to drive, thus providing a stable driving system.

Furthermore, the present technology may improve positioning performance and perform data processing relatively rapidly and accurately by not using duplicate data.

Furthermore, various effects may be provided that are directly or indirectly understood through the present disclosure.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

Hereinafter, the fact that pieces of hardware are coupled operably may include the fact that a direct and/or indirect connection between the pieces of hardware is established by wired and/or wirelessly.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle control apparatus, comprising:

a Light Detection and Ranging (LiDAR);

a memory configured to store map information; and a processor operably connected to the LiDAR and the memory, wherein the processor is configured to:

filter datasets including a road edge portion associated with a position of a vehicle from the map information according to a first predetermined condition related to at least one of a distance, or an angle, or any combination thereof;

obtain a plurality of first partial line segments by dividing a line segment included in at least one of the datasets and corresponding to the road edge portion based on a predetermined length, in the map information;

identify a plurality of second partial line segments from a plurality of line segments formed by contour points corresponding to the road edge portion through the LiDAR according to a second predetermined condition related to at least one of a distance, an angle, or a height, or any combination thereof;

identify pairs of the plurality of second partial line segments and the plurality of first partial line segments that are respectively closest to the plurality of second partial line segments in a vehicle coordinate system represented using the vehicle as a center thereof;

output a position of the vehicle in a second coordinate system different from a first coordinate system by use of a calibration amount related to at least one of a lateral movement of the vehicle based on the first coordinate system, or an amount of change in heading of the vehicle, or any combination thereof based on applying a predetermined algorithm to each of the pairs; and control the vehicle based on the position of the vehicle in the second coordinate system.

2. The vehicle control apparatus of claim 1, wherein the processor is further configured to identify at least one of the plurality of first partial line segments, the plurality of second partial line segments, or the pairs, or any combination thereof, in a plane formed by a first axis and a second axis, among the first axis, the second axis, and a third axis.

3. The vehicle control apparatus of claim 1, wherein the processor is further configured to:

identify the plurality of second partial line segments in each of layers separated by a third axis, among a first axis, a second axis, and the third axis; and identify first sub-pairs included in each of the layers among the pairs;

wherein the first sub-pairs include the plurality of first partial line segments that are respectively closest to the plurality of second partial line segments included in each of the layers.

4. The vehicle control apparatus of claim 1, wherein the processor is further configured to:

identify first identifiers assigned to the plurality of first partial line segments respectively;

identify second identifiers assigned to the plurality of second partial line segments respectively;

identify second sub-pairs in which a distance between the plurality of first partial line segments and the plurality of second partial line segments is less than a predetermined distance, among the pairs; and sequentially arrange at least one of the first identifiers or the second identifiers included in the identified second sub-pairs, or any combination thereof.

5. The vehicle control apparatus of claim 1, wherein the processor is further configured to select a portion of the plurality of second partial line segments in a plurality of layers separated by a third axis, among a first axis, a second axis, and the third axis, based on a type of construction of the map information.

6. The vehicle control apparatus of claim 5, wherein the processor is further configured to:

identify a portion of the plurality of second partial line segments identified in a first reference number of layers located at a top of the plurality of layers based on a type of construction of the map information being a top line construction type; and select a portion of the plurality of second partial line segments that are closest to a construction height of the map information, among the portion of the plurality of second partial line segments identified in the first reference number of layers.

7. The vehicle control apparatus of claim 6, wherein the top line construction type is a construction type in which the map information is generated based on a portion of the road edge portion identified at a highest height with respect to the third axis.

8. The vehicle control apparatus of claim 5, wherein the processor is further configured to identify a portion of the plurality of second partial line segments identified in a second reference number of layers located at a bottom of the plurality of layers based on a type of construction of the map information being a bottom line construction type.

9. The vehicle control apparatus of claim 8, wherein the bottom line construction type is a construction type in which the map information is generated based on a portion of the road edge portion identified at a lowest height with respect to the third axis.

10. The vehicle control apparatus of claim 1, wherein the predetermined algorithm includes at least one of an iterative closest point (ICP) algorithm, or a simultaneous localization and mapping (SLAM) algorithm, or any combination thereof.

11. A vehicle control method including:

filtering, by a processor, datasets including a road edge portion associated with a position of a vehicle from map information, according to a first predetermined condition related to at least one of a distance, or an angle, or any combination thereof;

obtaining, by the processor, a plurality of first partial line segments by dividing a line segment included in at least one of the datasets and corresponding to the road edge portion based on a predetermined length, in the map information;

identifying, by the processor, a plurality of second partial line segments from a plurality of line segments formed by contour points corresponding to the road edge portion through a Light Detection and Ranging (LiDAR) according to a second predetermined condition related to at least one of a distance, an angle, or a height, or any combination thereof;

identifying, by the processor, pairs of the plurality of second partial line segments and the plurality of first partial line segments that are respectively closest to the plurality of second partial line segments in a vehicle coordinate system represented using the vehicle as a center thereof;

outputting, by the processor, a position of the vehicle in a second coordinate system different from a first coordinate system by use of a calibration amount related to at least one of a lateral movement of the vehicle based on the first coordinate system, or an amount of change in heading of the vehicle, or any combination thereof based on applying a predetermined algorithm to each of the pairs; and controlling, by the processor, the vehicle based on the position of the vehicle in the second coordinate system.

12. The vehicle control method of claim 11, further including:

identifying, by the processor, at least one of the plurality of first partial line segments, the plurality of second partial line segments, or the pairs, or any combination thereof, in a plane formed by a first axis and a second axis, among the first axis, the second axis, and a third axis.

13. The vehicle control method of claim 11, further including:

identifying, by the processor, the plurality of second partial line segments in each of layers separated by a third axis, among a first axis, a second axis, and the third axis; and identifying, by the processor, first sub-pairs included in each of the layers among the pairs, wherein the first sub-pairs include the plurality of first partial line segments that are respectively closest to the plurality of second partial line segments included in each of the layers.

14. The vehicle control method of claim 11, further including:

identifying, by the processor, first identifiers assigned to the plurality of first partial line segments respectively;

identifying, by the processor, second identifiers assigned to the plurality of second partial line segments respectively;

identifying, by the processor, second sub-pairs in which a distance between the plurality of first partial line segments and the plurality of second partial line segments is less than a predetermined distance, among the pairs; and sequentially arranging, by the processor, at least one of the first identifiers or the second identifiers included in the identified second sub-pairs, or any combination thereof.

15. The vehicle control method of claim 11, further including:

selecting, by the processor, a portion of the plurality of second partial line segments in a plurality of layers separated by a third axis, among a first axis, a second axis, and the third axis, based on a type of construction of the map information.

16. The vehicle control method of claim 15, further including:

identifying, by the processor, a portion of the plurality of second partial line segments identified in a first reference number of layers located at a top of the plurality of layers based on the type of construction of the map information being a top line construction type; and selecting, by the processor, a portion of the plurality of second partial line segments that are closest to a construction height of the map information, among the portion of the plurality of second partial line segments identified in the first reference number of layers.

17. The vehicle control method of claim 16, wherein the top line construction type is a construction type in which the map information is generated based on a portion of the road edge portion identified at a highest height with respect to the third axis.

18. The vehicle control method of claim 15, further including:

identifying, by the processor, a portion of the plurality of second partial line segments identified in a second reference number of layers located at a bottom of the plurality of layers based on a type of construction of the map information being a bottom line construction type.

19. The vehicle control method of claim 18, wherein the bottom line construction type is a construction type in which the map information is generated based on a portion of the road edge portion identified at a lowest height with respect to the third axis.

20. The vehicle control method of claim 11, wherein the predetermined algorithm includes at least one of an iterative closest point (ICP) algorithm, or a simultaneous localization and mapping (SLAM) algorithm, or any combination thereof.

* * * * *